United States Patent [19]
Ratliff

[11] 3,934,485
[45] Jan. 27, 1976

[54] RESISTANCE-PRODUCING STRUCTURE FOR A TRANSMISSION SHIFTING MECHANISM

[75] Inventor: Richard L. Ratliff, Jackson, Mich.

[73] Assignee: Clark Equipment Company, Buchanan, Mich.

[22] Filed: June 17, 1974

[21] Appl. No.: 479,962

[52] U.S. Cl. ............................................. 74/473 R
[51] Int. Cl.² ...................... G05G 9/02; G05G 9/12
[58] Field of Search ........... 74/473 R, 475, 476, 477

[56] References Cited
UNITED STATES PATENTS

| | | | |
|---|---|---|---|
| 1,416,672 | 5/1922 | Asprooth | 74/475 |
| 2,098,708 | 11/1937 | Maker | 74/473 R |
| 2,115,089 | 4/1938 | Tenney | 74/473 R |
| 2,197,938 | 4/1940 | Lapsley | 74/473 R |
| 2,529,741 | 11/1950 | Roberts | 74/473 |
| 3,008,342 | 11/1961 | Brunot | 74/473 R |
| 3,250,143 | 5/1966 | Lyon | 74/473 R |
| 3,306,126 | 2/1967 | Hobbins | 74/473 |
| 3,527,114 | 9/1970 | Martz | 74/473 |
| 3,645,149 | 2/1972 | Fitzpatrick | 74/473 R |
| 3,677,105 | 7/1972 | Dence | 74/477 |

*Primary Examiner*—Allan D. Hermann
*Attorney, Agent, or Firm*—Ernst H. Ruf

[57] ABSTRACT

An improved resistance-producing structure for producing operator feel when manually shifting the gear shift lever unit of a mechanical transmission toward a predetermined position wherein this structure includes support housing boss portions for retaining a preloaded yieldable means which is abutted and further loaded by projections extending from the gear shift lever unit upon the movement of the gear shift lever unit toward a predetermined position.

12 Claims, 3 Drawing Figures

RESISTANCE-PRODUCING STRUCTURE FOR A TRANSMISSION SHIFTING MECHANISM

BACKGROUND OF THE INVENTION

1. Field of the Invention

The field of art to which this invention pertains includes that of transmission controls and more particularly to an improved resistance-producing structure for a manual shifting mechanism used with a mechanical transmission.

2. Description of the Prior Art

While manual shifting mechanisms for mechanical transmissions utilize a great variety of different designs and structures, they generally utilize a plurality of longitudinally shiftable members, such as shift rails or members associated therewith. Many of these structures utilize a shift lever unit that is mounted within a support housing and includes a shift lever bracket or gimbal that is mounted within the support housing for transverse rocking or pivoting movement on a longitudinal axis. Generally, a shift lever is carried by the gimbal for transverse movement therewith and is pivoted within the gimbal and relative thereto for longitudinal fore-and-aft shifting movement about a transverse axis. The shift lever and gimbal are swingable as a unit transversely on the longitudinal axis when the shift lever is vertical and the longitudinally shiftable members are centered, with the shift lever being swingable longitudinally on the transverse axis and including a downwardly projecting shift element for selectively engaging and longitudinally shifting each of the longitudinally shiftable members. A general structure of the type described hereinabove, but not restricted thereto, is shown and described in U.S. Pat. No. 3,667,105 to Dence (also assigned to the assignee of this invention).

It is also well known that overspeeding of the prime mover can occur by improper downshifting and that extensive damage to the transmission can occur by attempting to shift to reverse gear during forward motion. Thus, it is well known to provide the shifting mechanism with a resistance, which is felt by and must be overcome, by the operator when selecting, for example, first and/or reverse gear. The resistance-producing structure often takes the form of a plunger which is spring pressed outwardly so as to contact the shift lever and prevents accidental lateral movement of the shift lever unit into engagement with, for example, the first and/or reverse gear shift rail. Overcoming the resistance of the spring requires a conscious effort on the part of the operator and prevents accidental movement of the shift lever into the associated longitudinally shiftable member. A somewhat similar structure is shown in FIG. 5 of the above-referred to prior art patent.

While the prior art devices perform very satisfactorily, the addition of plungers, machined bores for containing plungers, as well as threaded elements associated therewith, make many of these prior art units expensive to manufacture and expensive to install. In addition, most of the prior art units are also overly-complicated for the simple function they are called upon to perform.

SUMMARY OF THE INVENTION

The improved resistance-producing structure of this invention solves the previously-noted problems of complexity as well as cost and is very easy to install. In the improved structure of this invention the shift mechanism support housing includes transversely opposed pairs of longitudinally extending bosses, these bosses preferably forming an integral part of the housing and including spaced upper and lower portions that are located below as well as laterally oppositely spaced from the longitudinal pivot axis of the gimbal. Preloaded yieldable means, in the form of opposed facing cups and having a compression spring confined therebetween, is interposed between each pair of spaced upper and lower boss portions. In addition, the gimbal has oppositely and longitudinally extending projections located below and laterally and oppositely spaced from the longitudinal pivot axis of the gimbal. The gimbal projection can enter between the spaced upper and lower boss portions so as to abut and further load the yieldable means when the shift lever and gimbal are swung about the longitudinal axis from a first position, when the shift lever and gimbal are vertical, to a second position so as to bring the gimbal projections into abutment with the yieldable means. The resulting resistance, which is felt by and must be overcome by the operator, prior to the engagement with the associated longitudinally shiftable member, provides the operator with the knowledge that he is in the process of engaging a particular shiftable member.

The improved structure of this invention, thus utilizes bosses and projections that are readily integrated with their respective members at their initial state of manufacture, e.g., such as during the casting operation. The yieldable means, i.e., the spring-and-cups assembly is readily manually inserted between each pair of spaced boss portions and the initial slight compression or preloading of the spring serves to retain the assembly between the opposed bosses. Therefore, no machining whatsoever is required, no threaded members are utilized and the assembly is simple, quick and fool-proof.

Other features and advantages of the invention will become more readily understood by persons skilled in the art when following the detailed description in conjunction with the several drawings.

DESCRIPTION OF THE PREFERRED EMBODIMENT

Figure 1:
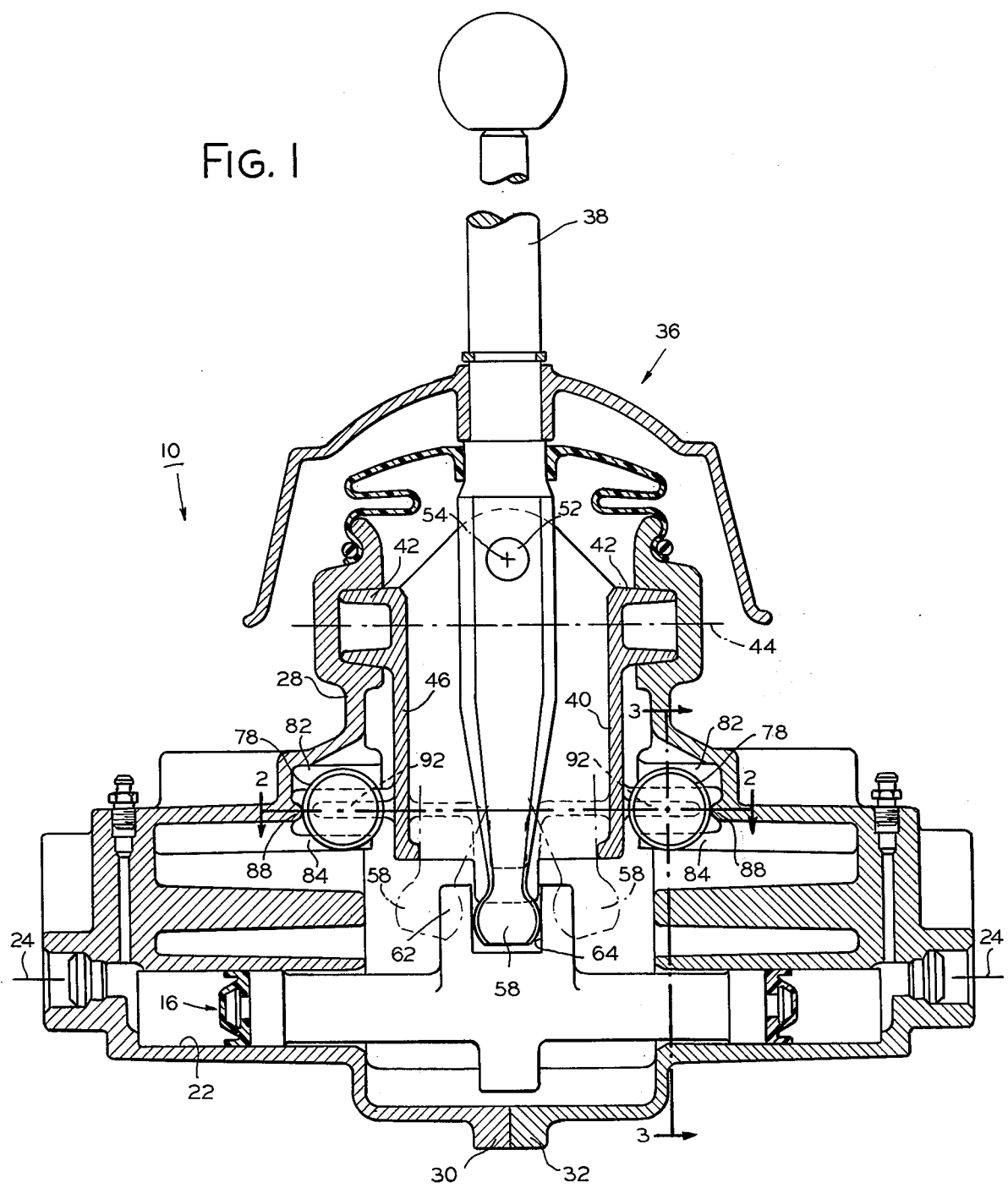
FIG. 1 is a vertical axial sectional view of a transmission shifting mechanism embodying the improvement of the present invention.

Referring now to the drawings in detail, particularly FIG. 1, there is shown a shifting mechanism for a mechanical transmission including the constructional details embodying the features of the present improvement.

Figure 2:
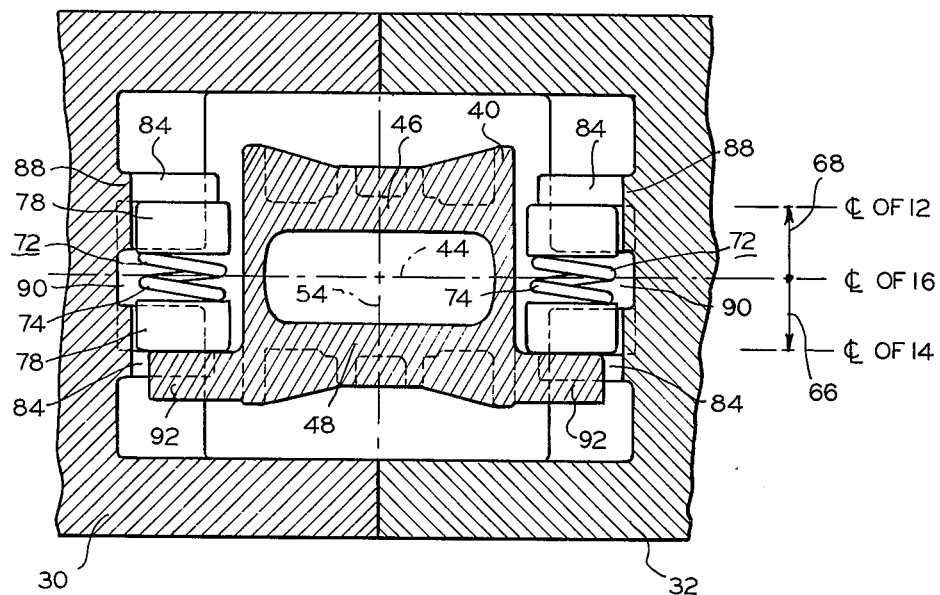
FIG. 2 is a horizontal sectional view taken along line 2—2 of FIG. 1.
Figure 3:
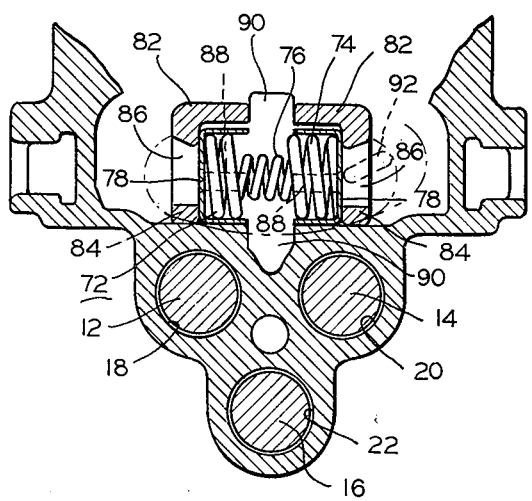
FIG. 3 is a vertical sectional view taken along line 3—3 of FIG. 1.

The shifting mechanism, denoted by numeral 10, which is generally shown in FIG. 1 and in various sections in FIGS. 2 and 3, includes a plurality of longitudinally shiftable members, such as, for example, pistons 12, 14, and 16 (best shown in FIG. 3), working in cylinders 18, 20 and 22 for longitudinal shifting movement therein. These cylinders are connected with hydraulic lines 24 which lead to corresponding cylinders in a servo unit (not shown). The servo unit includes pistons corresponding individually with pistons 12, 14 and 16 in shifting mechanism 10, with the pistons in the servo unit operating the shift rails of the transmission. The provision of the pistons in shifting mechanism 10 and the pistons in the servo unit, as well as the hydraulic line connection therebetween, together with the actuation of the shift rails in the transmission, is of generally known construction. It should be understood that the longitudinally shiftable members could, of course, be the shift rails themselves, rather than the previously referred to pistons, since the present invention relates to a specific improvement within a shifting mechanism regardless of the exact shape of the actuating members.

As best seen in FIG. 1, shifting mechanism 10 includes a housing 28 which may be made up of two assembled halves 30 and 32. Shifting mechanism 10 further includes a gear shift lever unit, generally designated by numeral 36, which includes a gear shift lever or stick 38 and a shift lever pivot bracket or gimbal 40. For ease of understanding, shift lever unit 36 may be described as having a central or neutral position in which shift lever 38 and gimbal 40 are vertical and the longitudinally shiftable members 12, 14 and 16 within the shifting mechanism 10 are centered. Gimbal 40 has bearings members 42 journaled within housing 28 so as to permit a transverse rocking or pivoting movement of gimbal 40 on or about a longitudinal axis 44 parallel to the longitudinally shiftable members and disposed at the upper part of housing 28. Gimbal 40 is, of course, restrained against displacement longitudinally and includes a pair of side members or plates 46 and 48 in which shift lever 38 is pivotally mounted by pin 52. Shift lever 38 is thus carried by gimbal member 40 for transverse movement therewith and pivoted therein and relative thereto for longitudinal fore-and-aft shifting movement about a transverse axis 54. The inner or lower end of shift lever 38 forms an extension 58 beyond pivot axis 54 for selectively engaging each of pistons 12, 14 and 16, with each of these pistons having a fork 62 that has a notch 64 that opens transversely in both directions.

It should be clear at this time that, in a neutral position of the gear shift lever unit previously referred to, both gear shift lever 38 and gimbal 40 are vertically disposed. Thus, in the neutral position each one of pistons 12, 14 and 16 are centered in their respective cylinders and gear shift lever extension 58 is disposed within fork 62 of piston 16. Engagement of gear shift lever extension 58 with the forks of either piston 12 or 14 requires the transverse rocking or pivoting of gimbal 40 about longitudinal axis 44. Once that fork 62 of the desired one of pistons 12, 14 and 16 has been engaged by shift lever extension 58, then gear shift lever 38 is pivoted, to the right or left, for longitudinal fore-and-aft shifting movement about transverse axis 54. For ease of understanding, the limits of the fore-and-aft shifting movement of shift lever extension 58 is indicated by the phantom line renditions of lever extension 58 in FIG. 1. The transverse movement of gimbal 40 is pictorially indicated on the right hand margin of FIG. 2 by arrows 66 and 68 which schematically (not to scale) demonstrate the transverse pivotal movement of gimbal 40 from its vertical or neutral position, i.e., when lever extension 58 engages fork 62 of piston 16, to the positions when lever extension 58 engages forks 62 of pistons 12 and 14 respectively.

It should, of course, be understood at this time that the number of shiftable members that are utilized will depend upon the number of gear ratios that are desired.

Each longitudinally shiftable member permits the selection of one or two gear ratios, depending on whether it is shiftable only fore or aft, or fore-and-aft from the neutral position. Shifting mechanism 10, by the use of pistons 12, 14 and 16 permits the selection of up to six gear ratios.

For discussion purposes, the assumption is made that one of the longitudinally shiftable members, namely, piston 12 controls first and reverse gear ratios; piston 16 controls second and third gear ratios; and piston 14 controls fourth and fifth gear ratios. Again, for the sake of discussion, most gear ratios are forward gear ratios and most of the shifting occurs from the second through the fifth ratios. It is also common knowledge that overspeeding of the prime mover can occur by improper downshifting and extensive damage to the transmission can occur by attempting to shift to reverse gear during forward motion. Therefore, it is well-known to provide the shifting mechanism with a resistance which must be overcome, by the operator, when selecting, for example, first and/or reverse gear.

In shifting mechanism 10 a yieldable means, generally denominated by numeral 72, in the form of one or more compression springs 74 and 76 are preloaded between two facing cups 78. This preloading is accomplished by interposing the facing cups and spring assemblies, i.e., yieldable means 72, between a pair of longitudinally extending upper and lower spaced boss portions 82 and 84 respectively, with boss portions 82 and 84 located on housing 28 below and laterally as well as oppositely and equally spaced from longitudinal pivot axis 44 of gimbal 40. Thus, as best seen in FIGS. 2 and 3, upper and lower boss portions 82 and 84 serve to confine yieldable means 72 against outward axial movement. However, as best seen in FIG. 3, upper and lower boss portions 82 and 84 respectively are vertically spaced apart so as to allow access, via opening 86, to yieldable means 72. In addition, each pair of boss portions 82 as well as boss portions 84 is transversely or laterally spaced apart so that their inner ends are separated by relief areas 90 whose function will be described later. Housing 28 is also provided with transversely extending rib portions 88 (best seen in FIGS. 1 and 2) that serve as radial abutment and locating means for facing cups 78.

As previously noted, gimbal 40 is shown in FIG. 2 in the vertical or neutral position, i.e., when shift lever extension 58 is engaged in fork 62 of centered piston 16. FIG. 2, as well as FIGS. 1 and 3, shows that gimbal 40 is provided with longitudinally extending projections 92, with projections 92 longitudinally extending in opposite directions from gimbal side plate 48. Thus, projections 92 which are located below and laterally spaced from gimbal longitudinal axis 44 enter through opening 86 between housing upper and lower boss portions 82 and 84 so as to abut and further load or compress yieldable means 72 when gimbal 40 is shifted from its central or neutral position in the direction so as to bring projections 92 toward a vertical plane passing through gimbal longitudinal pivot axis 44, i.e., when gimbal 40 is pivoted about its axis 44 so as to bring shift lever extension 58 into engagement with fork 62 of longitudinally shiftable member or piston 12. The resistance provided by yieldable means 72 when projection 92 contacts one of cups 78, (as best seen in FIG. 3) provides the operator with the knowledge that he is biasing gear shift lever 38 to a particular longitudinally shiftable member, e.g., the shift member controlling, for example, first and reverse gear ratios. Relief areas 90 permit ready transverse movement of cups 78 even if the latter have sharp outer edges on their annular end faces, since these end faces extend into areas 90.

It should be understood that, depending on the location of the shiftable member the shifting into which operator feel is desired, that projections 92 could, of course, instead be located on the opposite side plate 46 of gimbal 40 which would then provide for resistance when shifting toward longitudinally shiftable member or piston 14.

The improved resistance-producing structure of this invention thus basically includes the addition of at least one pair of longitudinally-extending upper and lower boss portions to the basic housing; interposing a pre-loaded yieldable means between a pair of the boss portions; and providing the gimbal with longitudinally-extending projections that can enter between the upper and lower boss portions so as to abut with and further compress the yieldable means when the shift lever is moved from the central position in one lateral direction. These boss portions and projections may readily be integrally incorporated into their respective members and co-act with the cups and springs of the yieldable means so as to produce a simple, fool-proof and inexpensive improved operator-feel-providing structure.

From the foregoing, it is believe that those familiar with the art will readily recognize and appreciate the novel concepts and features of the present invention. Obviously, while the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In a shifting mechanism for a mechanical transmission of the type including a support housing, a plurality of longitudinally shiftable members therewithin, a gear shift lever unit having a central position, a gimbal mounted within said support housing for transverse rocking or pivoting movement on a longitudinal axis but fixed against longitudinal movement, and a shift lever carried by said gimbal for transverse movement therewith and pivoted therein and relative thereto for longitudinal fore-and-aft shifting movement about a transverse axis, said shift lever having a downwardly projecting shift element for selectively engaging and longitudinally shifting each of said longitudinally shiftable members, the improvement comprising:
   a. said support housing including at least one pair of longitudinally-extending as well as spaced upper and lower boss portions located below and laterally and oppositely spaced from the longitudinal pivot axis of said gimbal;
   b. pre-loaded yieldable means interposed between said at least one pair of spaced upper and lower boss portions; and
   c. said gimbal having at least one longitudinally extending projection located below and laterally spaced from said gimbal longitudinal pivot axis, said projection entering between said spaced upper and lower boss portions to abut and further load said yieldable means, and thereby provide operator feel, upon the pivoting movement of said gimbal from said shift lever central position to a direction bringing said projection laterally toward said gimbal longitudinal pivot axis.

2. The improvement of claim 1 wherein said yieldable means includes a pair of spaced cup members having opposed open ends, with each of said cup members retaining one end of a compression spring interposed and preloaded therebetween.

3. The improvement of claim 2 wherein each of said pairs of upper and lower boss portions is transversely spaced apart and includes relief areas therebetween, with the opposed open ends of said cup members extending into said relief areas.

4. The improvement of claim 2 wherein said support housing further includes transversely extending rib portions, located between said upper and lower boss portions, that serve as a radial abutment and locating measn for said cup members.

5. The improvement of claim 1 wherein said boss portions are equally spaced from said gimbal longitudinal axis.

6. In a hydraulic shifting mechanism for a mechanical transmission of the type having a plurality of pistons longitudinally shiftable within a support housing for producing corresponding shifting movements in the transmission, a shift lever support bracket having an upper portion journalled in said support housing for transverse movement on a longitudinal first axis above said pistons, said support bracket including a pair of downwardly depending side plates, a shift lever extending between said support bracket side plates and pivoted therein on a second axis transverse to said first axis with the shift lever and support bracket being swingable as a unit transversely on said first axis when the shift lever is vertical and the pistons are centered, the shift lever being swingable longitudinally on said transverse second axis between said support bracket side plates and having a lower end extension below said second axis and being extendable into and selectively engageable with notches of respective ones of said pistons in response to transverse swinging movement of the shift lever and support bracket about said first axis and operative in response to longitudinal swinging of the shift lever about said transverse second axis for shifting a respective one of the pistons, wherein the improvement comprises:
   a. one of said support bracket side plates having oppositely and longitudinally extending projections located below and laterally spaced from said first axis;
   b. said support housing including transversely opposed pairs of longitudinally extending bosses, said bosses being located below said first axis and including spaced upper and lower portions so as to permit the passage therebetween of said support bracket side plate projections; and
   c. yieldable means confined between said opposed pairs of bosses and offering resistance to the passage of said support bracket side plate projections upon the swinging movement of said shift lever and support bracket about said first axis from a first position when said shift lever and support bracket are vertical to a second position when said shift lever and support bracket are so swung about said first axis so as to bring said support bracket side plates between said spaced upper and lower support housing boss portions, said resistance, which is felt by and must be overcome by an operator prior to the engagement with the associated piston, providing the operator with the knowledge that he is in the process of engaging a particular piston.

7. The improvement of claim 6 wherein said yieldable means includes a pair of facing cups and a compression spring interposed and retained therebetween, said spring biasing said cups against a pair of said opposed bosses, with said support bracket side plate, projections upon entering between said upper and lower boss portions abutting one of said cups and laterally displacing same so as to further compress said spring, thereby imparting the desired operator feel.

8. The improvement of claim 6 wherein said bosses are equally spaced from said first axis.

9. In a manually operated shifting mechanism for a mechanical transmission of the type having a plurality of actuating members, longitudinally shiftable within a support housing, for producing corresponding shifting movement in the transmission, a shift lever gimbal having an upper portion journalled in said support housing for transverse movement on a longitudinal first axis above said actuating members, said gimbal including a pair of downwardly depending side plates, a shift lever extending between said side plates and pivoted therein and being swingable longitudinally on a second axis transverse to said first axis with the shift lever and gimbal being swingable as a unit transversely on said first axis when the shift lever is vertical, the shift lever having a lower end extending below said second axis and being extendable into and selectively engageable with notches of respective ones of said actuating members, in response to transverse swinging movement of the shift lever and gimbal about said first axis and operative in response to longitudinal swinging of the shift lever about said transverse second axis for shifting a respective one of the actuating members, wherein the improvement comprises in combination:

a. one of said gimbal side plates having longitudinally-extending opposed projections located below and longitudinally spaced from said second axis;

b. said support housing including transversely opposed pairs of longitudinally extending bosses, said bosses being located below said second axis and including vertically spaced first and second portions so as to permit the passage therebetween of said gimbal side plate projections; and c. resilient means confined between said first and second portions of said opposed pairs of bosses and offering resistance to the passage of said gimbal side plate projections upon the swinging movement of said shift lever and gimbal about said first axis from a first position when said shift lever and support bracket are vertical to a second position when said shift lever and support bracket are pivoted about said first axis so as to bring said gimbal side plate projections between said spaced first and second support housing boss portions and in contact with said resilient means, said resilient means providing a resistance which is felt by the operator and provides him with knowledge that he is engaging a particular actuating member.

10. The improvement of claim 9 wherein said resilient means includes a pair of spaced cup members having opposed open ends, with each of said cups retaining one end of a compression spring interposed and preloaded therebetween.

11. The improvement of claim 10 wherein said transversely opposed pairs of bosses include relief areas therebetween, with the opposed open ends of said cup members extending into said relief areas.

12. The improvement of claim 10 wherein said support housing further includes transversely extending rib portions, located between said first and second boss portions, that serve as radial abutment and locating means for said cup members.

* * * * *